United States Patent
Bremer

(10) Patent No.: US 12,188,798 B2
(45) Date of Patent: Jan. 7, 2025

(54) ACOUSTIC BAND-PASS FILTER ASSEMBLIES, WIRELESS BLOCKAGE MONITORS, AND RELATED METHODS

(71) Applicant: Intelligent Agricultural Solutions LLC, Fargo, ND (US)

(72) Inventor: Marshall T Bremer, Fargo, ND (US)

(73) Assignee: Intelligent Agricultural Solutions LLC, Fargo, ND (US)

( * ) Notice: Subject to any disclaimer, the term of this patent is extended or adjusted under 35 U.S.C. 154(b) by 0 days.

(21) Appl. No.: 17/905,550

(22) PCT Filed: Mar. 2, 2021

(86) PCT No.: PCT/US2021/020441
§ 371 (c)(1),
(2) Date: Sep. 2, 2022

(87) PCT Pub. No.: WO2021/178390
PCT Pub. Date: Sep. 10, 2021

(65) Prior Publication Data
US 2023/0097657 A1 Mar. 30, 2023

Related U.S. Application Data

(60) Provisional application No. 62/985,433, filed on Mar. 5, 2020, provisional application No. 62/984,634, filed on Mar. 3, 2020.

(51) Int. Cl.
*G01F 1/66* (2022.01)
*G10K 11/04* (2006.01)

(52) U.S. Cl.
CPC ............. *G01F 1/662* (2013.01); *G01F 1/666* (2013.01); *G10K 11/04* (2013.01)

(58) Field of Classification Search
CPC .......... G01F 1/662; G01F 1/666; G01K 11/04
See application file for complete search history.

(56) References Cited

U.S. PATENT DOCUMENTS

| 4,251,687 A * | 2/1981 | Deutsch | H04R 1/2865 381/337 |
|---|---|---|---|
| 8,418,804 B1 * | 4/2013 | Hawwa | F01N 1/161 381/353 |
| 9,330,062 B2 | 5/2016 | Thurow et al. | |
| 2012/0189150 A1 * | 7/2012 | Thome | H04R 1/2842 381/332 |

(Continued)

FOREIGN PATENT DOCUMENTS

EP    1 739 933 A1    1/2007
WO    2015/149078 A1    10/2015

OTHER PUBLICATIONS

European Patent Office, International Search Report related to International Patent Application No. PCT/US2021/020441, mail date Jun. 9, 2021.

*Primary Examiner* — David Z Huang
*Assistant Examiner* — Jean F Morello

(57) ABSTRACT

An acoustic band-pass filter assembly includes an inlet, a microphone configured to receive acoustic energy from the inlet, and a plurality of resonator chambers disposed in series between the inlet and the microphone and configured to transmit acoustic energy between the inlet and the microphone. Each of the plurality of resonator chambers has a different cross-sectional area.

18 Claims, 9 Drawing Sheets

(56) References Cited

U.S. PATENT DOCUMENTS

2016/0322687 A1* 11/2016 Weiß .................. H01P 1/2138
2019/0024608 A1   1/2019 Griffin
2019/0204130 A1   7/2019 Heilman et al.

* cited by examiner

ACOUSTIC BAND-PASS FILTER ASSEMBLIES, WIRELESS BLOCKAGE MONITORS, AND RELATED METHODS

CROSS-REFERENCE TO RELATED APPLICATIONS

This application is a national phase entry under 35 U.S.C. § 371 of International Patent Application PCT/US2021/020441, filed Mar. 2, 2021, designating the United States of America and published in English as International Patent Publication WO 2021/178390 A1 on Sep. 10, 2021, which claims the benefit of U.S. Provisional Patent Application 62/984,634, "Stanley Coupler," filed Mar. 3, 2020, and U.S. Provisional Patent Application 62/985,433, "Stanley Coupler," filed Mar. 5, 2020, the entire disclosure of each of which is incorporated herein by reference.

BACKGROUND

The present disclosure relates generally to the field of precision agriculture, and more specifically to a material flow sensing system for dry-particulate spreaders, including but not limited to self-propelled floaters and pull-type particulate spreaders.

The Wireless Blockage Monitor (WBM) determines the rate of flow by recording the acoustic signal created by a seed (or other material) impact on a sensor membrane and then processing the digital audio signal. The acoustic energy is conveyed with little loss from the sensor to the microphone mounted on the system's PCB via a flexible rubber tube (aka hose). It is anticipated that a more accurate determination of flow would be obtained by counting individual seed impacts as opposed to measuring the overall acoustic energy as is done in existing products (See, e.g., U.S. Pat. No. 9,330,062, "Vehicle Control and Gateway Module," granted May 3, 2016).

The issue is that the signal created by a single seed impact can occupy a significant amount of time, such that at high rates of material flow, the signals from subsequent impacts will overlap and frustrate efforts to count individual impacts. The "significant amount of time" is due to general resonances in the sensor components (cavity acoustic modes and audio range vibrational modes) and that the large acoustic amplitudes frequently exceed the limits of the microphone, artificially extending the exponential decay of the impact "ring out". The invention described here limits the low frequency energy transmitted, preventing saturation of the signal. Furthermore, the high frequency components of the impact signature tend to decay faster (likely due to stronger absorption in the sensor materials). These two benefits combine to create a much shorter overall impact signature.

SUMMARY

In one embodiment, the present disclosure concerns an acoustic band-pass filter assembly with an inlet, a microphone configured to receive acoustic energy from the inlet, and a plurality of resonator chambers disposed in series between the inlet and the microphone. The resonator chambers are configured to transmit acoustic energy between the inlet and the microphone. Each of the plurality of resonator chambers has a different cross-sectional area.

In another embodiment, the present disclosure relates to a wireless blockage monitor for determining a rate of flow. This wireless blockage monitor includes a sensor membrane configured to be impacted by a flowing material, a microphone configured to receive acoustic energy created by impact of the sensor membrane, a tube connecting the sensor membrane to the microphone, and a band-pass filter disposed between the tube and the microphone. The band-pass filter includes an inlet connected to the tube, and a plurality of resonator chambers disposed in series between the inlet and the microphone and configured to transmit acoustic energy between the inlet and microphone. These resonator chambers include a closed resonator chamber disposed adjacent the microphone, and at least one open resonator chamber. In open resonator chambers, the first end includes a first wall with an opening therethrough and wherein the second end is fully open. In the closed resonator chamber, the first end has a second wall with an opening therethrough connecting the closed resonator chamber to the second end of the open resonator chamber. The second end of the closed resonator chamber has a closed wall, with the microphone forming at least a portion of that closed wall.

The present summary is provided only by way of example, and not limitation. Other aspects of the present disclosure will be appreciated in view of the entirety of the present disclosure, including the entire text, claims and accompanying figures.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles disclosed. The figures may not be drawn to scale, and applications and embodiments of the present disclosure may include features, steps and/or components not specifically shown in the drawings.

DETAILED DESCRIPTION

Figures 1, 1A:
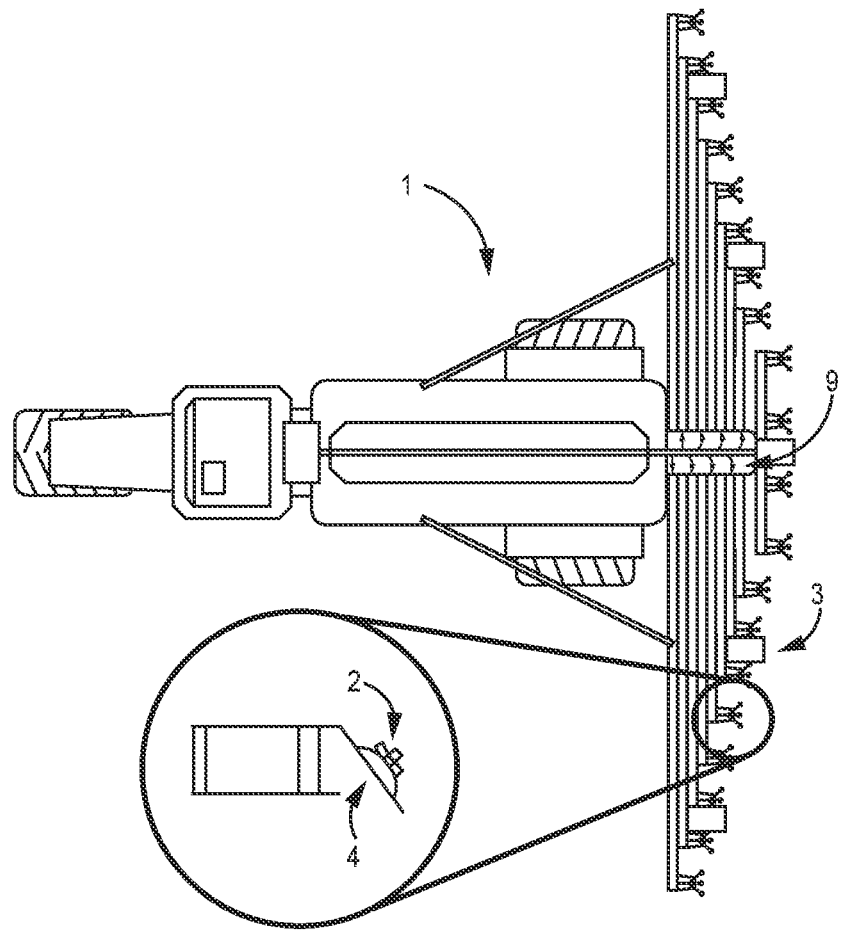
FIG. 1 is an overhead view of a typical floater machine with a close-up of a deflector with an acoustic sensor attached.
FIG. 1A is an enlarged view of a sensor of FIG. 1.

FIGS. 1 and 1A display the components of a typical dry-particulate spreader 1 as taught by U.S. Patent Publication 2019/0204130 A1, "Material Flow Monitoring System and Method," published Jul. 4, 2019. Dry-particulate spreader 1 includes a plurality of acoustic sensors 2 and electronic control units (ECUs) 3, which can wirelessly connect acoustic sensors 2 to a mobile device used by an operator to monitor particulate flow. Each acoustic sensor 2 is connected to a deflector plate or sensor membrane 4 configured to intercept a flow of particulate material exiting a tube. During a spreading operation, dry particulate material conveyed through the tube impacts sensor membrane 4 on the way to the ground. Acoustic sensors 2 convert vibrations of sensor membrane 4 to pressure waves, which are transmitted via an acoustic tube (hose) to ECUs 3. Acoustic signals are used to detect and identify flow, e.g., to identify faults or blockages and/or flow material types.

A key design change contemplated herein is the incorporation of a specialized acoustic band-pass filter into an electronic control unit (ECU) cover. The acoustic high band-pass filter may eliminate microphone saturation and shorten the impact's ring-out duration. The shortened impulse response helps enable accurate estimation of flow in the time domain. The acoustic band-pass filter may be similar to an optical band-pass filter (e.g., an antireflection coating) configured to tailor the interference of waves to selectively pass or reflect specific sets of acoustic frequencies.

The ECU 3 takes the acoustic energy (acoustic signal) and transduces it into an electronic signal using the microphone. This is converted to a digital signal and processed by a computer algorithm that may be embedded in the ECU in some embodiments. In some embodiments, the signal filtering function of the acoustic band-pass filter could be implemented on the acoustic signal, the electronic signal, or the digital signal with basically the same outcome. In the present case, the acoustic signal can fall outside the frequency capacity of the microphone, necessitating that high-pass filtering be performed on the acoustic signal. Further, filtering the signal in acoustic rather than digital form can be especially cost effective because the acoustic band-pass filter replaces an existing component, requiring only different structural geometry rather than any extra materials or components. The acoustic band-pass filter can also be useful in further applications such stethoscopes where the acoustic signal is only transduced by a human ear.

The acoustic band-pass function of the acoustic band-pass filter is produced by purely geometric means, without introducing additional materials or absorbing features. The geometry of the acoustic band-pass filter manipulates the constructive and destructive interference of different frequency components of the acoustic signal to pass only the frequency range of interest. The acoustic band-pass filter can be incorporated into the molding of the top piece of the ECU and requires little to no additional cost to incorporate.

An acoustic path consists of a closed volume that can be considered as a series of tubes of different lengths and diameters. These tube elements convey the acoustic signal with limited loss and in a manner analogous to electrical wires or fiber optic cables. As with fiber optics and electrical transmission lines, the interfaces between different components (changes in impedance) creates reflections and resonant structures. These structures interact and determine the frequencies that are passed or reflected through the transmission line. The overall intensity of the transmitted signal can be limited without introducing acoustically absorbing materials, which may have temperature dependent properties and undesirably primarily attenuate high frequencies.

In one embodiment, a structure was introduced that limited the overall acoustic transmission by acting as a band-pass filter. In this way, the signal amplitude can be reduced to prevent saturation, while maintaining the transmission of the frequency of interest. This concept is disclosed further to show how further exploration led to creating a large reduction in amplitude while also shortening the duration of the impact ring-out.

Tests were performed using a straight tube coupled to a MEMS microphone mounted on a board. In these tests, beads were lightly dropped to avoid saturation and in order to observe the raw waveform. The ring-out (acoustic signal) of these impacts is significantly shorter when the signal is high-pass filtered and there is little baseline noise. As the signal saturates, much of the high frequency content that is only present at the beginning of the bead strike ring-out is lost. High-pass digital filtering does not solve the issue due to the saturation that will occur with the high-speed impacts encountered in the real application. The saturation of the signal will eliminate the high frequency components which are only present at the start of the impact waveform. The goal of the present disclosure is to set forth an embodiment of an in-line acoustic filter that would pass a broad band of frequencies above ~10 kHz, thereby eliminating most of the energy in the signal while also supporting a short duration impulse that can be synthesized using a broad range of high frequency components.

FIG. 2 is top perspective view of an embodiment of an acoustic band-pass filter assembly. FIG. 3 is a cross-sectional perspective view of an acoustic band-pass filter of the assembly of FIG. 2. FIG. 4 is a simplified cross-sectional view of internal chambers of the acoustic band-pass filter of FIGS. 2 and 3 coupled to a microphone. FIGS. 2-4 are discussed together.

FIG. 2 shows acoustic band-pass filter assembly 10, sensor 2 with sensor membrane 4, and flexible tube 14. Acoustic band-pass filter assembly 10 includes acoustic band-pass filter 16, ECU cover 18, mounting holes 20, and reference port 22. FIG. 3 shows acoustic band-pass filter 16, resonator chambers 24, 26, and 28, and tube connection 30 with inlet 32. FIG. 4 shows resonator chambers 24, 26, and 28, end wall 34, and microphone 36. Resonator chambers 24, 26, and 28 are also referred to herein as "cavities."

Acoustic band-pass filter assembly 10 can be used in conjunction with a WBM, which can be used to determine a rate of flow by recording the acoustic signal created by a seed (or other material) impact on sensor membrane 4. Acoustic band-pass filter assembly 10 is connected to sensor 2 via flexible tube 14. Flexible tube 14 is an auditory tube, which can be connected to tube connection 30 of acoustic band-pass filter 16. During operation, inlet 32 of acoustic band-pass filter 16 transmits acoustic energy received from sensor membrane 4 via flexible tube 32 to resonator chambers 24, 26, and 28. Resonator chambers 24, 26, and 28 are connected in series. End wall 34 can be a printed circuit board. Microphone 36 forms a portion of end wall 34 of resonator chamber 28 to receive the acoustic energy received from inlet 32 via resonant chambers 24, 26, and 28. Microphone 36 can be a MEMS device as known in the art. ECU cover 18 can be fastened to an ECU via fasteners provided through mounting holes 20. ECU cover 18 is not limited to the shape and configuration provided herein but shown only to illustrate an example of how acoustic band-pass filter 16 can be incorporated into an ECU cover. The acoustic band-pass filter may be in contact with a PCB 34 of ECU 3 so that it could be incorporated into an ECU design through a molded cover/microphone port. This should not be considered a limiting design feature. During operation, the information from microphone 36 can be processed and transmitted to a Controller Area Network, which is connected to a central gateway communication computing device. The information can be aggregated, processed, and presented to an operator via a mobile device for monitoring particulate flow in real time.

Acoustic band-pass filter 16 includes tube connection 30 with inlet 32. In some embodiments, inlet 32 can have a horn shape geometry decreasing in cross-sectional area between an upstream opening of inlet 32 and an adjacent resonator chamber 24. The term "upstream" refers to an acoustic wave propagation direction from inlet 32 to microphone 36. A horn shape in inlet 32 can provide some acoustic benefit as described further below.

Figure 4:
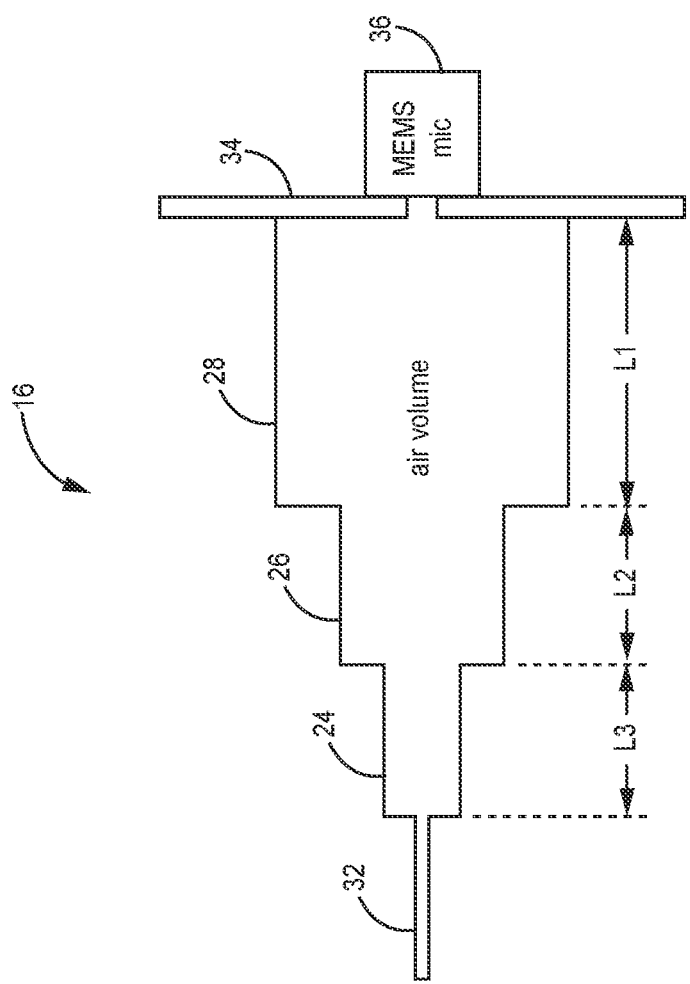
FIG. 4 is a simplified cross-sectional view of internal chambers of the acoustic band-pass filter of FIGS. 2 and 3 coupled to a microphone.
Figure 3:
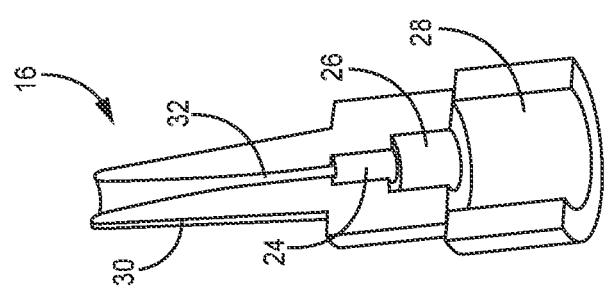
FIG. 3 is a cross-sectional perspective view of an acoustic band-pass filter of the assembly of FIG. 2.

Acoustic band-pass filter 16 includes a plurality of resonator chambers 24, 26, and 28. Although three resonator chambers are illustrated in FIGS. 3 and 4, alternative embodiments can include two or more resonator chambers. Resonator chambers 24, 26, and 28 are disposed in series between inlet 32 and microphone 36 and configured to transmit acoustic energy between inlet 32 and microphone 36. Each resonator chamber 24, 26, and 28 extends along a primary axis between a forward end closer to inlet 32 than microphone 36 and an opposite aft end closer to microphone 36 than to inlet 32. The terms "forward" and "aft" refer to an acoustic wave propagation direction from inlet 32 to microphone 36. Acoustic band-pass filter 16 includes at least one open resonator chamber 24, 26 and a closed resonator chamber 28. Although two open resonator chambers 24, 26 are shown, alternative embodiments of an acoustic band-pass filter can include a single open resonator chamber can or more than two open resonator chambers as needed for different applications. Open resonator chambers 24, 26 include at the forward end, a wall 24a, 26a with an opening therethrough, and have a fully open second end. Closed resonator chamber 28, which is disposed adjacent to microphone 36 includes at the forward end, a wall 28a with an opening therethrough, and a closed wall 28b at the aft end formed at least in part by microphone 36. The terms "open" and "closed" are used merely to describe differences in resonator chambers 24, 26, and 28 at the aft ends. As illustrated in FIG. 4, closed resonator chamber 28 is in fact only closed at the aft end.

Each resonator chamber 24, 26, and 28 has a different cross-sectional area. As illustrated, resonator chambers 24, 26, and 28 can be cylindrical and have different diameters. Resonator chambers 24, 26, and 28 can be arranged in series from inlet 32 to microphone 36 in order of increasing cross-sectional area or diameter. Resonator chamber 24 has a larger diameter than inlet 32. Inlet 32 opens to resonator chamber 24 via an opening in forward wall 24a. A diameter of the opening in forward wall 24a can be equal to an inner diameter of inlet 32. Resonator chamber 26 has a larger diameter than resonator chamber 24. The aft open end of resonator chamber 24 opens to resonator chamber 28 via the opening in forward wall 26a. An inner diameter of resonator chamber 24 can equal a diameter of the opening through forward wall 26a. Resonator chamber 28 has a larger diameter than resonator chamber 26. The aft open end of resonator chamber 26 opens to resonator chamber 28 via the opening in forward wall 28a. An inner diameter of resonator chamber 26 can equal a diameter of the opening through forward wall 28a. The changes in diameter produce impedance changes that create rejection and pass bands through the interference of reflected waves.

In other embodiments, resonator chambers can be tapered along a primary axis extending between a first end closer to inlet 32 than microphone 36 and an opposite second end closer to microphone 36 than to inlet 32. Tapered walls can generally change the effective length of the resonant chambers.

Each resonator chamber 28, 26, and 24 has a length (L1, L2, L3, respectively) along the primary axis between inlet 32 and microphone 36. In some embodiments, a length L1 of closed resonator chamber 28 can be twice the length of open resonator chambers 24 and 26 (i.e., L2 and L3 can be equal to L1/2). A total length of (sum of all resonator chamber lengths) determines the transmitted frequencies, shifting the frequencies higher as the length dimension is reduced.

The following one dimensional acoustic transmission analysis will help to explain how the acoustic band-pass filter was designed. If the acoustic wave is confined to a tube-like section (the confinement and/or cross sectional shape is not critical), then low frequencies will propagate as plane waves along the tube axis. There is no longer a 1/r (r is distance from source) amplitude drop off of the wave and it will maintain the same amplitude forever if there is no absorption. This simplification is reasonably accurate if the wavelength is roughly greater than the tube diameter. (A 20 kHz frequency has wavelength of 17 mm.)

Figure 5:
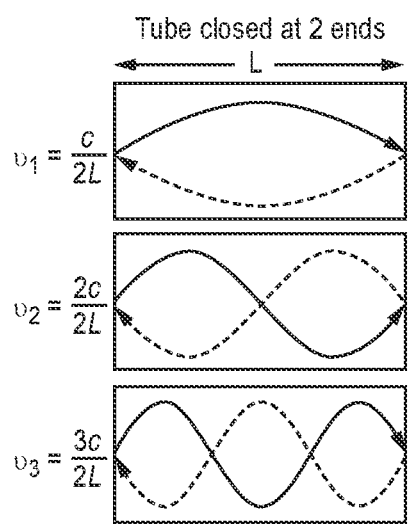
FIG. 5 shows resonant frequency and harmonics of the frequency at c/2L.

The following is an analysis of resonant frequencies of a single chamber or tube. A chamber or tube closed at both ends will have a resonant frequency as well as harmonics of this frequency at c/2L (c is the speed of sound and 2L is the speed of light). This is because an acoustic signal of these frequencies will be in-phase with itself after one round trip. FIG. 5 shows resonant frequency and harmonics of the frequency at c/2L.

Figure 6:
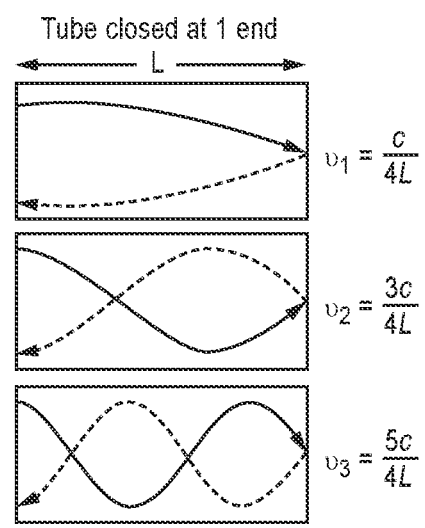
FIG. 6 shows shifted resonances for a tube closed at one end only.
Figure 7:
FIG. 7 shows an optical etalon.

A tube closed at one end will have shifted resonances due to the phase change at only one end. FIG. 6 shows the shifted resonances. An expanded region (chamber) in a tube will resonate like a closed tube. This chamber will act as a band-pass filter, passing frequencies near the resonances much like an optical etalon as shown in FIG. 7. Increasing the relative change in cross-sectional area through the chamber will sharpen the bands. However, this scenario requires a tube of infinite length. In reality, the tubing is finite and the entire sensor's air volume is equivalent to a series of chambers.

Figure 10:
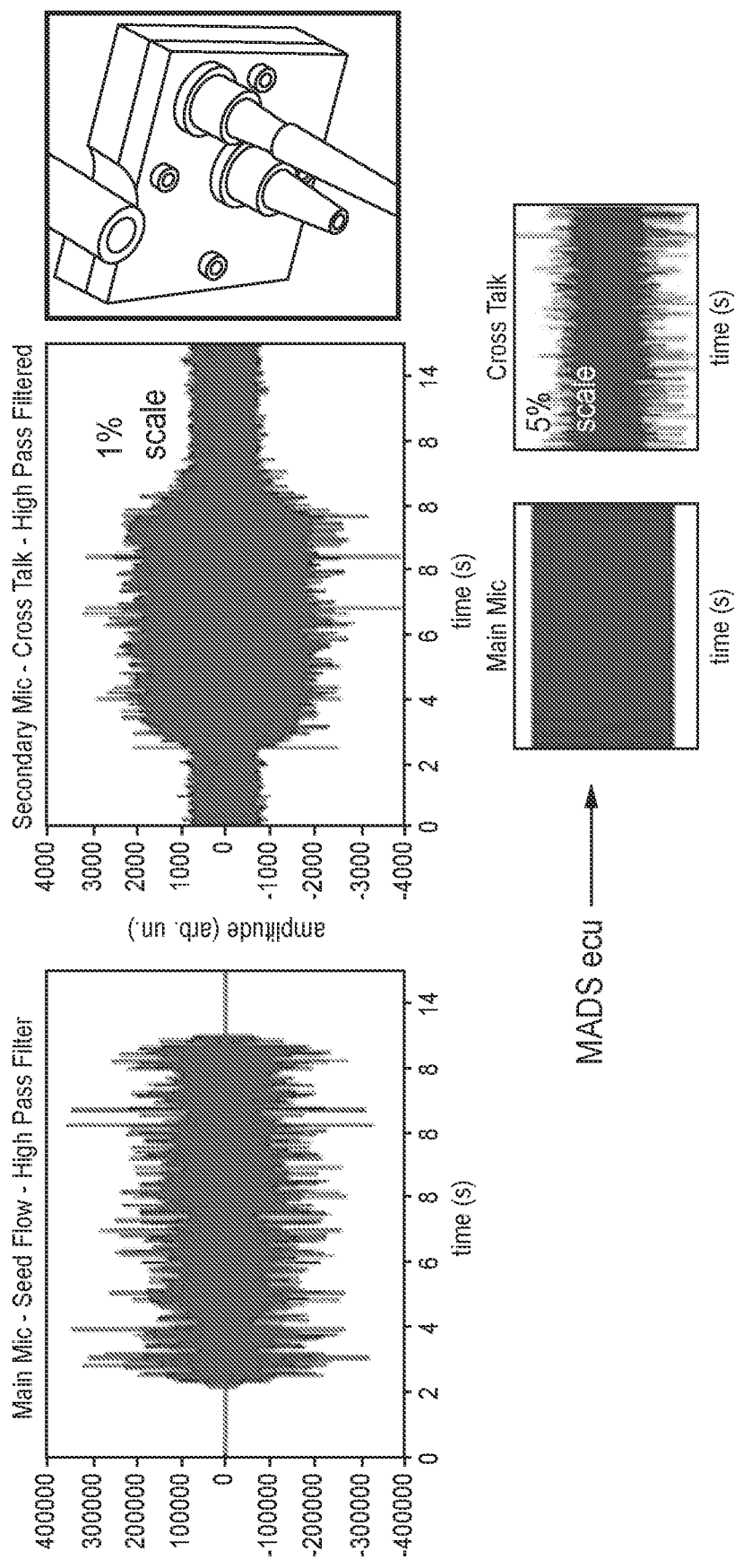
FIG. 10 shows cross-talk with and without the acoustic band-pass filter of FIGS. 2-4.

Using the above one-dimensional acoustic transmission analysis, the acoustic band-pass filter may have three pass bands or three high frequency resonances (plus their harmonics). Each of the three resonator chambers 24, 26, and 28 is designed for the same (approximately 17 kHz) fundamental frequency, but when combining open and closed cavities, these frequencies split (the strength of the impedance changes can control the amount of shift) and become three neighboring frequencies. It was anticipated that these transmission peaks would be broadened due to absorption to produce a single broad transmission band at high frequencies. The acoustic band-pass filter was shown to reflect all of the low frequency content (FIG. 10). The reflected low frequency energy is dissipated through absorption in the tubing.

Figure 8:
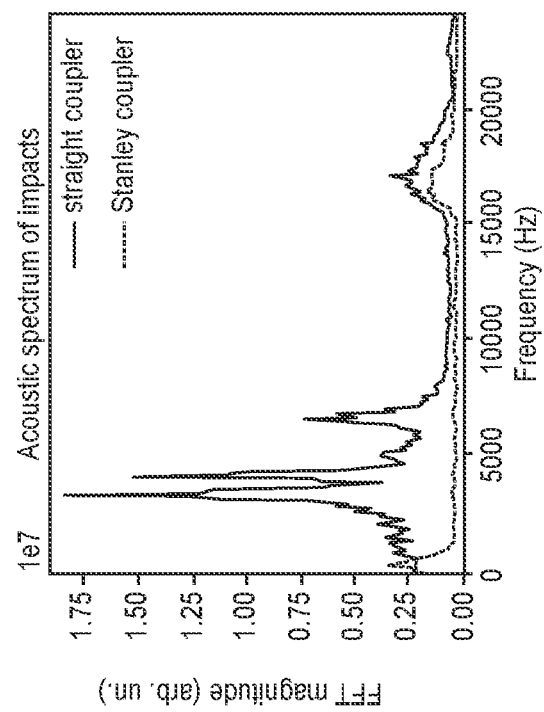
FIG. 8 shows an acoustic spectrum of impacts of a straight coupler versus the acoustic band-pass filter of FIG. 3, and compares the Fast Fourier Transfer magnitude of the acoustic signal.

FIG. 8 shows the acoustic spectrum of impacts of a straight coupler versus acoustic band-pass filter 16 and compares the Fast Fourier Transfer magnitude of the acoustic signal. Acoustic band-pass filter 16 nearly eliminates the strong low frequency component seen with the straight coupler while maintaining significant transmission at high frequencies. FIG. 8 discloses non-limiting, exemplary values.

Figure 9:
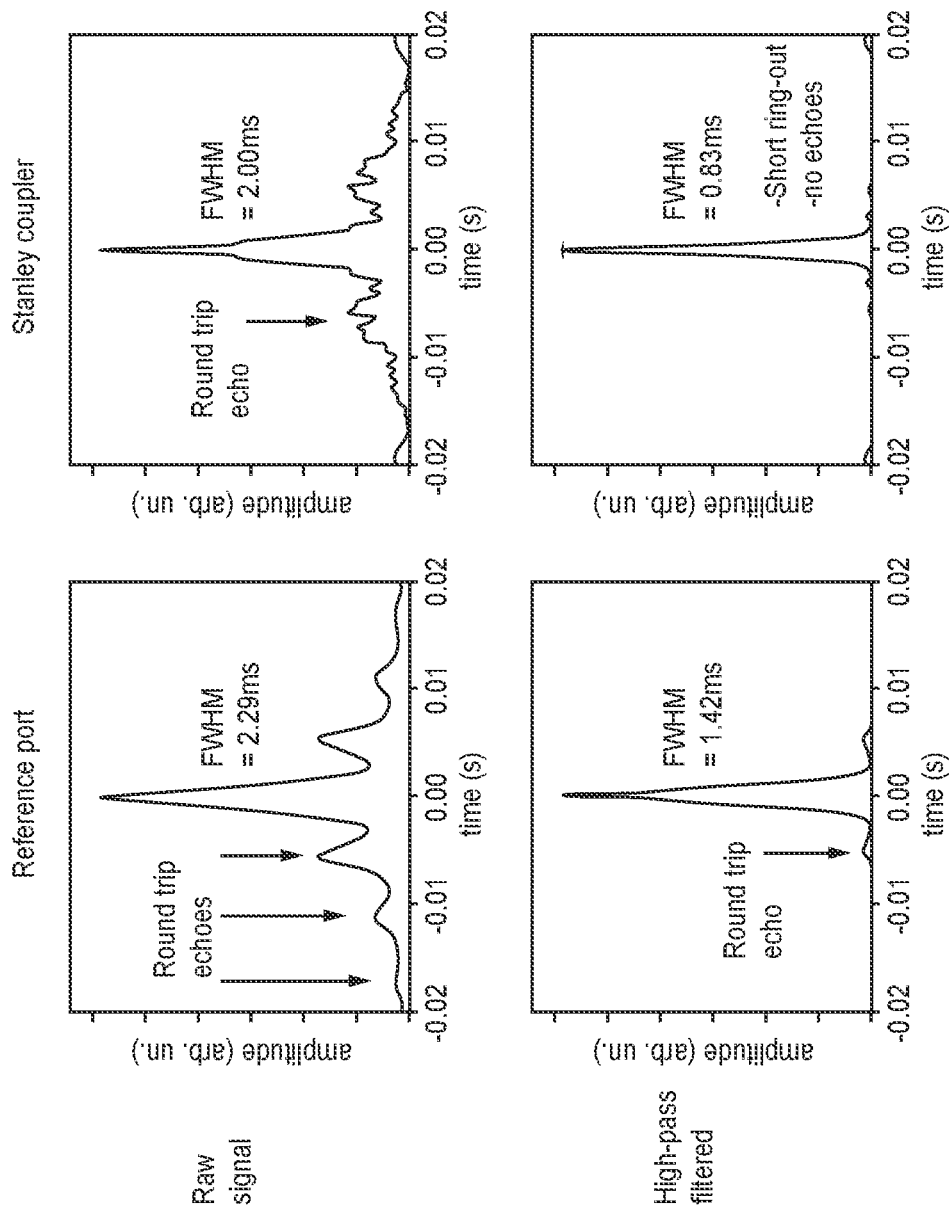
FIG. 9 shows impulse duration with and without the acoustic band-pass filter of FIGS. 2-4.

In lab testing, it was experimentally confirmed that acoustic band-pass filter 16 reduces the duration of the impact ring-out. In FIG. 9, the full width half max (FWHM) of the envelope autocorrelation is used as a measure of pulse duration. FIG. 9 displays experimental confirmation that the impulse duration is shorter as demonstrated through autocorrelation and that by using the acoustic band-pass filter 16 as a high-pass filter, the resulting audio shows that the shortest pulse duration is achieved.

FIG. 9 demonstrates that the reference port signal shows a broad central peak and several reflections that will produce a heavily convoluted waveform where individual impacts are hard to isolate. FIG. 9 further demonstrates that on its own, acoustic band-pass filter 16 reduces the impulse duration and reduces the prominence of the echoes. By high pass filtering the resulting signal, the impulse is significantly reduced and the echoes are removed. FIG. 9 discloses non-limiting, exemplary values.

Acoustic band-pass filter 16 functions as an acoustic band-pass filter, passing only a broad band at high acoustic frequencies (greater than 10 kHz). This was done to remove enough energy from the acoustic signal to prevent saturation while also maintaining the bandwidth required to support a short acoustic pulse. The focus on high frequency content has the added benefit of producing shorter ring-outs and potentially reducing cross-talk and background noise. This is because these very high acoustic frequencies are typically absorbed faster than low frequency components and less energy is transmitted outside of the acoustic air volume. This is anticipated to reduce background noise and cross-talk between microphone ports.

Figure 2:
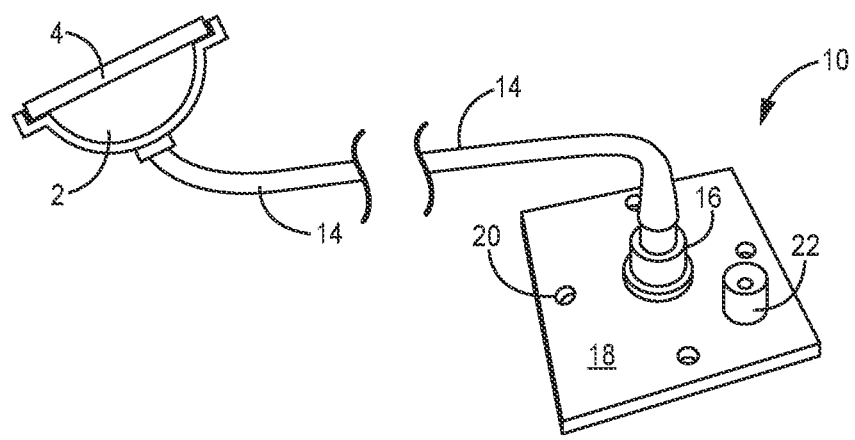
FIG. 2 is top perspective view of an embodiment of an acoustic band-pass filter assembly.

Acoustic band-pass filter 16 was also shown to reduce the audio picked up by an adjacent microphone, known as cross-talk. Audio was recorded on both channels of the microphone board of the modified ECU, while only one port received signal from the sensor. The cross-talk after high pass filtering is roughly 1%, while cross-talk observed between adjacent ports on a MADS ECU is nearly 5%. Cross-talk, or picking up signal from an adjacent port, was tested and is reduced by about 5× when compared to the MADS ECU as shown in FIG. 10. The 1% cross-talk is on the signal waveform and will likely be reduced to zero as any time-domain algorithm is likely to have a higher threshold for a signal to be considered an impact. Note that cross-talk in a final ECU design will depend on many factors including venting and the gasket design and material. Although not illustrated, there is room for a flat O-ring (16.13 mm in diameter) on a backside of ECU cover 18 in FIG. 2. FIG. 10 discloses non-limiting, exemplary values.

Figure 11:
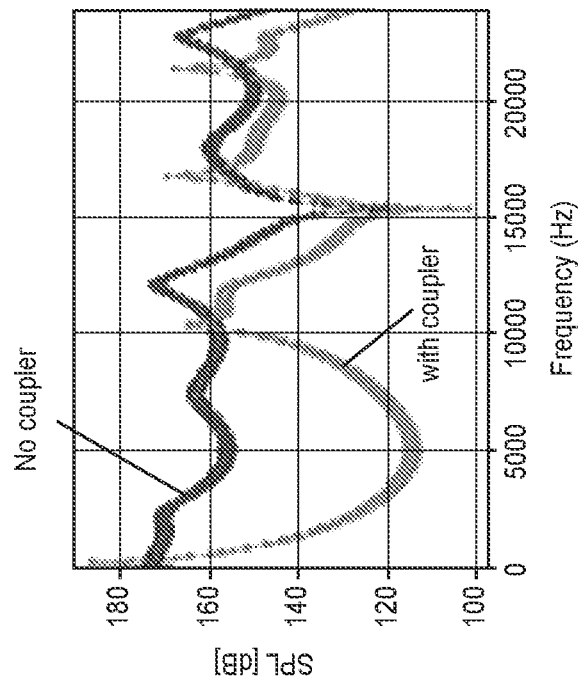
FIG. 11 shows a simulation of the air volume with and without the acoustic band-pass filter of FIGS. 2-4.

FIG. 11 shows a simulation of the air volume with and without acoustic band-pass filter 16. There is a broad, substantial dip in the transmission near 5 kHz. FIG. 11 discloses non-limiting, exemplary values.

Simulation of the full air volume created by the sensor element 2, hose 14, acoustic band-pass filter 16 and the PCB port show the acoustic band-pass filter 16 to function as intended. FIG. 11 shows the simulated sound pressure level (SPL) at microphone 36 due to harmonic excitation at deflection plate 4 versus frequency. The intended effect is the deep reduction of the transmitted energy (approximately 100 times at 5 kHz) at low frequencies, where much of the acoustic energy of the impact resides, while maintaining transmission at high frequencies (10 kHz+).

Figure 12:
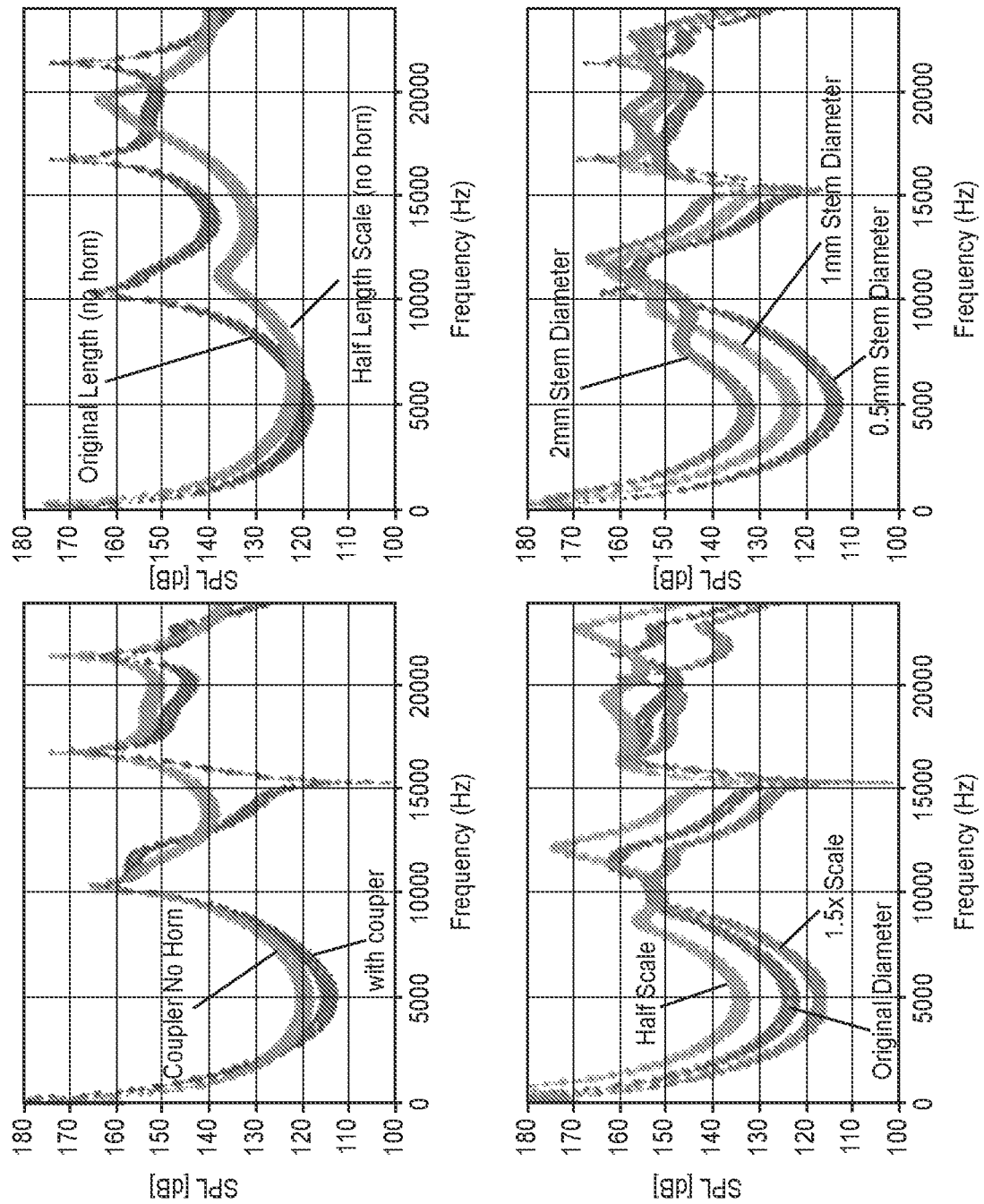
FIG. 12 shows simulations of the air volume with varying acoustic band-pass filter features.

Several parameters were varied in the simulation to understand the basic effects of the dimensions. The results are summarized in FIG. 12. FIG. 12 shows simulations of the air volume with varying acoustic band-pass filter features. FIG. 12 discloses non-limiting, exemplary values.

The inclusion of the sensor horn (as opposed to exciting just the end of the tube) is responsible for a few features in the acoustic spectrum as shown. Notably, the large dip at 15 kHz is due to some element of the horn geometry.

The length scale of acoustic band-pass filter 16 determines the transmitted frequencies, shifting them higher as the length dimension is reduced. The scale of the diameter of acoustic band-pass filter 16 roughly determines the strength of the effect, since the greater the relative change in diameter, the greater percentage of acoustic energy will be reflected. A diameter of inlet 32 also determines the strength of the effect. While it may be desirable to increase the size of inlet 32 to facilitate manufacture, this could reduce the desired effect of acoustic band-pass filter 16.

Figure 13:
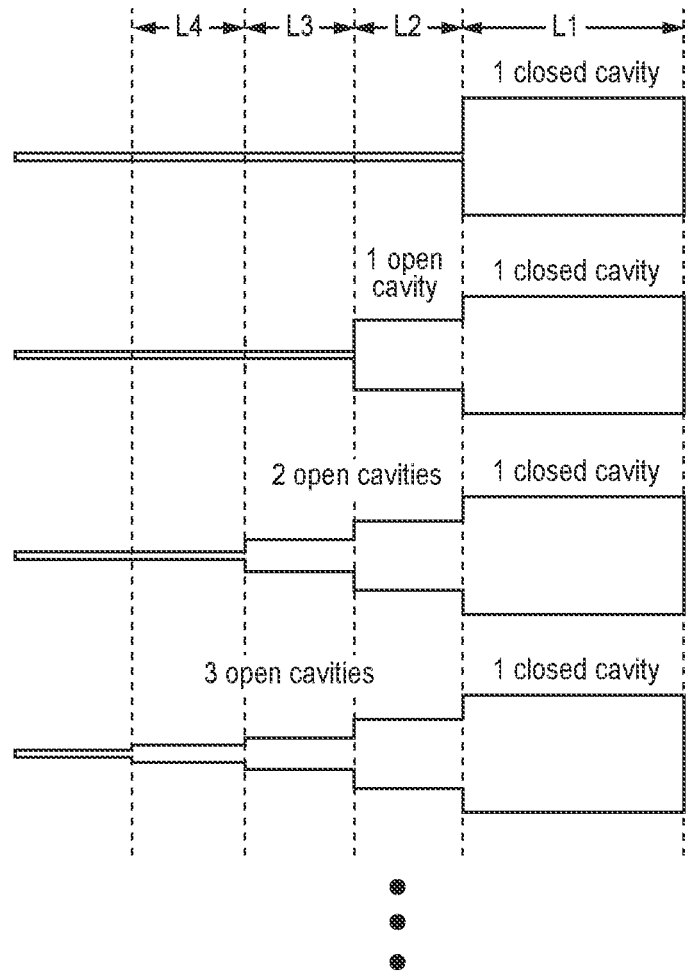
FIG. 13 shows alternative acoustic band-pass filter geometries.

Other embodiments may be envisioned that add or remove structure elements but produce similar effects on the acoustic transmission. Examples are shown in FIG. 13. Note that these geometries are all easily moldable since cross sections become progressively smaller (instead of larger, smaller, larger, . . . which may also work but would create more difficulty to mold). Open cavities can have lengths (L2, L3, L4) equal to half the length of the closed cavity L1 or a length of L1/2. Other embodiments envisioned may have tapered walls, which are easier to mold, and would have slightly adjusted dimensions since tapers generally change the effective length of cavities. Further, slight variations in the ratios of the cavity lengths would likely still be effective and the ratios shown are not to be considered excessively rigid.

The acoustic band-pass filter as disclosed herein provides significant improvement over conventional wireless blockage monitors by acting as an acoustic high pass filter that eliminates microphone saturation and shortens the impact's ring-out duration. The shortened impulse response helps enable accurate estimation of flow in the time domain.

SUMMATION

Any relative terms or terms of degree used herein, such as "substantially," "essentially," "generally," "approximately," and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

The invention claimed is:
1. An acoustic band-pass filter assembly comprising:
an inlet;

a microphone configured to receive acoustic energy from the inlet; and a plurality of resonator chambers disposed in series between the inlet and the microphone and configured to transmit acoustic energy between the inlet and the microphone, each of the plurality of resonator chambers having a different cross-sectional area; wherein the cross-section of each resonator chamber increases between the inlet and the microphone.

2. The acoustic band-pass filter assembly of claim 1, wherein each resonator chamber of the plurality of resonator chambers has a first end closer to the inlet than to the microphone, and an opposite second end closer to the microphone than to the inlet, wherein the resonator chamber extends from the first end to the second end along a primary axis extending from the inlet to the microphone, and wherein the plurality of resonator chambers includes:

at least one open resonator chamber, wherein the first end includes a first wall with an opening therethrough and wherein the second end is fully open to a first end of an adjacent resonator chamber of the plurality of resonator chambers; and a closed resonator chamber disposed adjacent the microphone, wherein the first end has a second wall with an opening therethrough connecting the closed resonator chamber to the second end of the at least one open resonator chamber, and wherein the second end of the closed resonator chamber has a closed wall, wherein the microphone forms at least a portion of the closed wall.

3. The acoustic band-pass filter assembly of claim 2, wherein the at least one open resonator chamber comprises a plurality of open resonator chambers.

4. The acoustic band-pass filter assembly of claim 3, wherein each open resonator chamber of the plurality of open resonator chambers has a first length along the primary axis.

5. The acoustic band-pass filter assembly of claim 4, wherein the closed resonator chamber has a second length along the primary axis, the second length being greater than the first length.

6. The acoustic band-pass filter assembly of claim 5, wherein the second length is twice the first length.

7. The acoustic band-pass filter assembly of claim 2, wherein each resonator chamber of the plurality of resonator chambers has a generally cylindrical tapered wall centered about the primary axis.

8. The acoustic band-pass filter assembly of claim 2, wherein the inlet has a horn shape decreasing in cross-sectional area between an upstream opening of the inlet and the at least one open resonator chamber.

9. The acoustic band-pass filter assembly of claim 7, wherein the resonator chambers are arranged in series from the inlet to the microphone in order of increasing diameter.

10. A wireless blockage monitor for determining a rate of flow, the wireless blockage monitor comprising:

a sensor membrane configured to be impacted by a flowing material;

a microphone configured to receive acoustic energy created by impact of the sensor membrane;

a tube connecting the sensor membrane to the microphone; and a band-pass filter disposed between the tube and the microphone, wherein the band-pass filter comprises:

an inlet connected to the tube; and a plurality of resonator chambers disposed in series between the inlet and the microphone and configured to transmit acoustic energy between the inlet and microphone, plurality of resonator chambers including:

at least one open resonator chamber, wherein the first end includes a first wall with an opening therethrough and wherein the second end is fully open; and a closed resonator chamber disposed adjacent the microphone, wherein the first end has a second wall with an opening therethrough connecting the closed resonator chamber to the second end of the at least one open resonator chamber, wherein the second end of the closed resonator chamber has a closed wall, and wherein the microphone forms at least a portion of the closed wall;

wherein the cross-section of each resonator chamber increases between the inlet and the microphone.

11. The wireless blockage monitor of claim 10, wherein the at least one open resonator chamber comprises a plurality of open resonator chambers.

12. The wireless blockage monitor of claim 10, wherein each resonator chamber of the plurality of resonator chambers extends a length from the first end to the second end along a primary axis extending from the inlet to the microphone, and wherein the length of the closed resonator chamber is at least twice the length of the at least one open resonator chamber.

13. The wireless blockage monitor of claim 10, wherein each resonator chamber is generally cylindrical.

14. The wireless blockage monitor of claim 10, wherein the inlet has a horn shape decreasing in cross-sectional area between an upstream opening of the inlet and the at least one open resonator chamber.

15. A method of forming an acoustic band-pass filter assembly, the method comprising:

forming a body defining an inlet, an open end, and a plurality of resonator chambers disposed in series between the inlet and the open end, each of the plurality of resonator chambers having a different cross-sectional area; wherein the cross-section of each resonator chamber increases between the inlet and the open end;

providing an end wall over the open end of the body, the end wall configured to receive a microphone; and providing a microphone on the end wall.

16. The method of claim 15, wherein forming a body comprises molding the body.

17. The method of claim 15, wherein forming a body comprises forming the body to have a horn shape decreasing in cross-sectional area between the inlet and the at least one open resonator chamber.

18. The method of claim 15, wherein forming a body comprises forming the resonator chambers to each have a generally cylindrical tapered wall.

* * * * *